United States Patent

Hauser

[11] 3,945,070
[45] Mar. 23, 1976

[54] WIRE THREAD CAST INSERT

[75] Inventor: Frank William Hauser, Santa Monica, Calif.

[73] Assignee: Avia Instrument Company, Lafayette, Calif.

[22] Filed: May 19, 1975

[21] Appl. No.: 578,643

[52] U.S. Cl. ............... 10/1 A; 10/86 R; 85/32 CS; 151/14 CS; 164/111
[51] Int. Cl.² ........................................ B21D 53/24
[58] Field of Search ................ 10/1 A, 86 R, 86 A; 85/32 CS; 151/14 CS; 164/111, 112

[56] References Cited
UNITED STATES PATENTS

| | | | |
|---|---|---|---|
| 123,823 | 2/1872 | Guard | 10/86 R |
| 556,082 | 3/1896 | Boeddinghaus | 85/32 CS |
| 914,915 | 3/1909 | Bedell | 164/111 |
| 1,311,646 | 7/1919 | Gordon | 85/32 CS |
| 2,480,966 | 9/1949 | Richardson et al. | 10/86 R |
| 2,524,480 | 10/1950 | Schenk | 85/32 CS |
| 3,112,540 | 12/1963 | Kaneko et al. | 164/111 |
| 3,183,762 | 5/1965 | Poupitch | 151/38 |
| 3,272,250 | 9/1966 | Hattan | 10/86 R |
| 3,880,041 | 4/1975 | Markowski et al. | 85/32 CS |

*Primary Examiner*—C. W. Lanham
*Assistant Examiner*—E. M. Combs
*Attorney, Agent, or Firm*—Ralph B. Pastoriza

[57] ABSTRACT

A threaded opening is formed in a plastic or metallic body formed by molding or casting by providing a wire in a helical configuration supported on a core member and then molding or casting the material about the helical configuration. This helical configuration or insert is initially provided with a thread pitch greater than that desired for the final threaded opening so that shrinkage of the material as it hardens adjusts the greater thread pitch of the helical insert to the desired final value.

7 Claims, 8 Drawing Figures

WIRE THREAD CAST INSERT

This invention relates generally to wire thread inserts and more particularly to an improved method and insert product for providing threaded openings in molded or cast bodies such as plastic parts or die-cast aluminum zinc, and similar materials.

BACKGROUND OF THE INVENTION

To provide a strong threaded opening in a plastic body or a cast body of soft metal, such as aluminum, it is common practice to provide a helical wire insert to define the threads in the opening. Thus, normal practice after a body has been molded or cast involves drilling a hole in the body at the desired location of the threaded opening, tapping the hole, inserting the helical wire configuration and then removing tangs or bent end portions to provide the final threaded insert construction. The helical wire itself may be made of stainless steel to provide strength and minimization of corrosion and the end product results in a strong threaded opening in the plastic or soft metal body which serves to receive threaded fasteners for various purposes in assemblying structures utilizing such bodies.

The foregoing process of providing the threaded openings is relatively expensive and time-consuming. Further, there is often not provided a thorough locking of the helical insert itself within the tapped opening against rotational as well as axial movement.

In some instances wherein concrete type material is used, a threaded insert opening has been provided by molding or casting the concrete about a helical wire configuration held in position with the actual fastener used. The problem with this particular process is the fact that metal and plastic materials tend to shrink when they solidify and thus the final pitch of the threaded opening is different from the designed pitch of the helical insert.

BRIEF DESCRIPTION OF THE PRESENT INVENTION

Bearing all of the foregoing considerations in mind, the present invention contemplates an improved method and insert product for providing threaded openings in plastic or metal bodies formed by molding or casting.

More particularly, in accord with a method of the invention, a wire of given cross-sectional shape is formed into a helical configuration wherein the pitch of the helical turns is adjusted over a major length of the configuration to a given value greater than the desired final given thread pitch to be provided in the threaded opening of a body. An internal support in the form of a core is introduced into the helical configuration, this core having an outside diameter corresponding substantially to that of the inside diameter of the helical configuration. Thereafter, the material involved such as plastic or metal is molded or cast around the helical configuration and support until it hardens into a solid body. The internal support or core is then removed to leave a threaded opening in the body, the shrinkage of the body during cooling reducing the pitch of the helical configuration to correspond to that of the finally desired given thread pitch of the opening.

The helical wire insert itself is provided with unique end portions which extend beyond the outside diameter of the helical configuration and thence turn towards each other to terminate in directions parallel to the axis of the helix. These extending end portions serve as "tangs" to lock the insert against rotation. Further, in the preferred embodiment of the invention the cross section of the wire making up the helical configuration is rhombic-shaped with the long diagonal of the rhombus normal to the axis of the helical configuration. By utilizing this specific cross-sectional shape, the helical configuration is locked against axial movement in the body after it hardens and further there is provided a desired shape threading for the threaded opening.

A further feature of this invention involves forming end turns of the helical configuration with a pitch different from the pitch of the remaining portion of the helical configuration so that the final threaded opening has a dual thread pitch which serves as a thread lock for fastening devices inserted in the finished threaded opening.

BRIEF DESCRIPTION OF THE DRAWINGS

A better understanding of this invention will be had by now referring to the accompanying drawings in which.

DETAILED DESCRIPTION OF THE INVENTION

Figure 1:
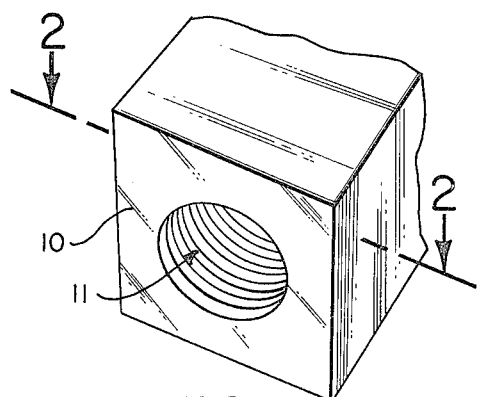
FIG. 1 is a fragmentary perspective view of a body provided with a threaded opening in accord with the method and product of this invention.

Referring to FIG. 1, there is shown a body 10 which may be formed by molding or casting provided with a threaded opening 11 containing the wire insert of this invention. As mentioned heretofore, such threaded openings are normally provided in plastic or soft metal materials by tapping a hole in the material and then inserting a wire wound into a helical configuration to match the tapped threads to provide the threaded opening of sufficient thread strength.

Figure 2:
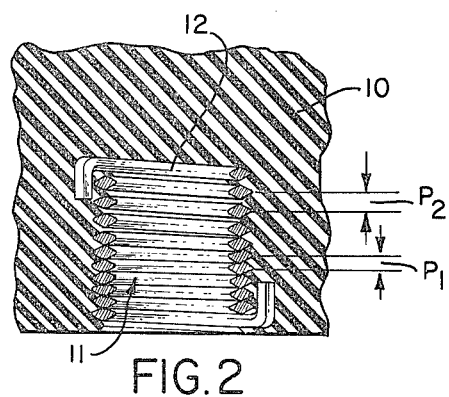
FIG. 2 is a fragmentary cross section taken in the direction of the arrows 2—2 of FIG. 1.

FIG. 2 shows the threaded insert itself at 12 defining the threaded opening 11 in the body 10. In the example of FIGS. 1 and 2, the body 10 is of a plastic material and in accord with the invention is molded about the insert 12 all as will become clearer as the description proceeds.

In the specific example of FIGS. 1 and 2, it will be noted that the thread pitch over a major length of the threaded opening is designated P1. The upper turns of the helical configuration defining the insert 12 on the other hand have a different thread pitch P2. In this specific embodiment, the dual thread pitch arrangement is provided to provide a thread lock for the threads of a fastener inserted into the threaded opening

11.

Figure 3:
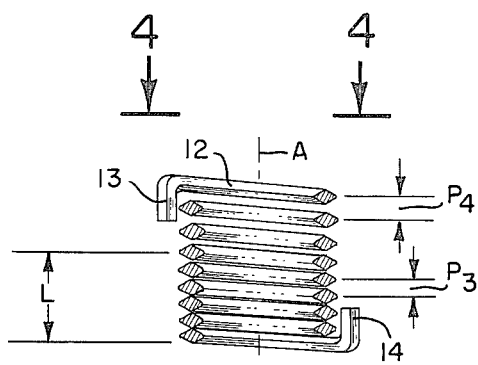
FIG. 3 is a cross-section of a first embodiment of the wire insert of this invention utilized in forming the threaded opening in the body of FIGS. 1 and 2.

Referring now to FIG. 3 there is shown the threaded insert 12 itself wherein it will be noted that it is formed by a wire shaped into a helical configuration. In accord with an important feature of this invention, the pitch of the threads of this helical configuration over a major length such as the length L indicated in FIG. 3 is designed to have a given value P3 which is greater than the given thread pitch desired in the final threaded opening 11 described in FIGS. 1 and 2. The purpose for making this thread pitch P3 greater is to compensate for shrinkage of the surrounding material during a molding or casting operation when it hardens, this shrinkage reducing the pitch of the helical wire configuration to the final desired given thread pitch in the opening of the body.

In order to provide the dual thread feature described in FIG. 2, the end turns at one end of the insert as illustrated in FIG. 3, are provided with a pitch P4 greater than the pitch P3.

It will be understood that when material is molded about the insert 12 of FIG. 3 the shrinkage will reduce the respective pitches P3 and P4 to the values P1 and P2 shown in FIG. 2.

In order to lock the insert against rotational movement, the end portions of the helical configuration extend beyond the diameter of the helix and thence are turned towards each other to terminate in directions parallel to the axis A of the helical configuration. These ends are designated 13 and 14 in FIG. 3 respectively.

Figure 4:
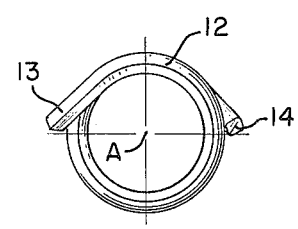
FIG. 4 is a top plan view of the insert of FIG. 3 looking in the direction of the arrows 4—4.

The positioning of these end portions 13 and 14 will be clear from the plan view of the helical configuration of FIG. 4.

Figure 5:
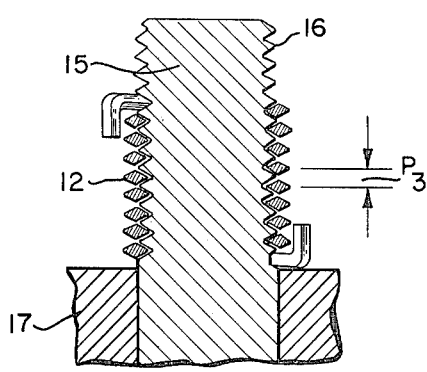
FIG. 5 is a cross section illustrating the insert of FIG. 3 provided with an internal support core in accord with certain steps in the method of the invention.

Referring now to FIG. 5 there is shown at 15 an internal support in the form of a core provided with external threads 16. This core is internally received in the helical configuration 12 and functions to support the helical configuration and the desired pitch P3 over a major portion of the insert during a molding or casting operation of material about the insert. In the particular example of FIG. 5, the helical insert 12 is shown with a uniform pitch P3 rather than the dual pitch described in conjunction with FIG. 3 merely to show that the invention is not necessarily limited to the provision of a dual pitch threaded opening. However, as in the case of FIG. 3, the pitch P3 is adjusted to have a given value greater than the finally desired threaded pitch of the threaded opening in the body to compensate for shrinkage during the molding operation.

It will be understood in FIG. 5 that material is simply molded or cast about the insert 12 and internal support 15. Thereafter, the internal support 15 is removed by simply unthreading the same from the molded or cast body. In this respect, it will be understood that the threads 16 on the internal support or core 15 have a tolerance sufficient to permit removal of the core even though the pitch P3 changes to the value P1 described in FIG. 2 after the surrounding material has hardened. In FIG. 5 part of the die for the mold or cast supporting the core 15 is shown at 17.

Figure 6:
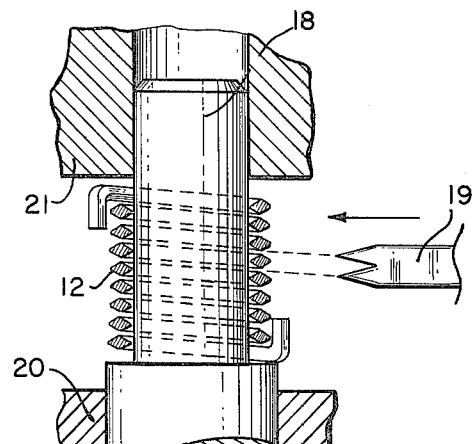
FIG. 6 is a view similar to FIG. 5 but illustrating a modified internal support or core shown in full lines.

Referring now to FIG. 6 there is shown a modified type of internal support or core at 18. In this embodiment, the core has a smooth cylindrical surface and an outer diameter corresponding substantially to the inside diameter of the helical insert 12. In the particular embodiment of FIG. 6, there is shown an external tooling 19 which defines a given value of thread pitch corresponding to P3 as described in FIG. 5 by way of example. The arrangement in FIG. 6 is utilized to provide a desired final adjustment of the pitch of the helical wire insert 12 on the internal support core 18 prior to the molding operation. Thus it will be understood that when the pitch of the threads is accurately adjusted by the tool 19, they will be retained in their adjusted position by the friction of the turns with the surface of the core 18.

Also in FIG. 6 are shown die or mold body portions 20 and 21, it being understood that the material is molded or cast about the helical insert 12 and core 18.

FIGS. 5 and 6 thus illustrate respectively an internal and external means of holding the helical insert with a desired pitch preparatory to molding material about the same. It should be understood, however, that the helical insert itself may be properly formed to be freestanding with a desired pitch such as illustrated in FIG. 3 in which case the core may have a smooth cylindrical surface as shown in FIG. 6 but no external tooling such as 19 is necessary, the helical insert itself being freestanding at the proper pitch.

Figure 7:
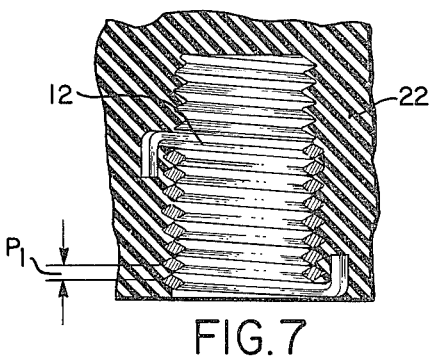
FIG. 7 is a cross section of a body showing the resultant threaded opening formed by the structure of FIG. 5; and, FIG. 8 is a view similar to FIG. 7 of the threaded opening formed by the structure of FIG. 6.

FIG. 7 is a cross section of the molded body about the insert 12 after completion of the molding or casting operation. In FIG. 7 it will be noted that the final pitch has been reduced to P1 as a consequence of shrinkage of plastic material 22.

Figure 8:
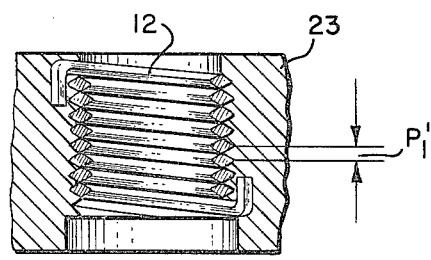

FIG. 8 is a cross section of the final threaded opening with the insert 12 provided in accord with the structure of FIG. 6 wherein by way of example, the material involved is a metal 23 rather than a plastic merely to illustrate that the invention is applicable to both molded plastic products and cast metal products. As in the case of FIG. 7 the pitch has been reduced to a value indicated at P1'. Since metal has a different coefficient of shrinkage while cooling than the plastic, the final pitch P1' will be different than the pitch P1. However, the pitch P1' can be made the same as the pitch P1 if desired by adjusting the spacing P3 described in the previous drawings of the helical insert to a different value prior to molding.

In all of the configurations as described, it will be appreciated that the provision of the extending end portions which turn to an axial direction lock the final insert against rotation in the body while the rhombic shaped cross-section locks the insert against axial movement. It will also be appreciated that the configurations described in FIGS. 5, 6, 7 and 8 could be provided with a dual pitch in the manner described with respect to FIGS. 2 and 3 to provide a thread lock.

From the foregoing description, it will be evident that the present invention has provided an improved method and product for providing threaded openings in molded plastic or cast soft metal bodies wherein the prior art operations of having to tap a hole, insert the insert itself, and remove tangs are avoided.

While both molding and casting have been mentioned throughout this application, it is to be understood that the word "cast" or "casting" as used in the appended claims is meant to include either molding or casting of material.

What is claimed is:

1. A method of providing a threaded opening of given thread pitch in a cast body of material having a predetermined shrinkage upon solidification comprising the steps of:

a. forming a wire of given cross-sectional shape into a helical configuration wherein the pitch of the helical turns is adjusted over a major length of the configuration to a given value greater than said given thread pitch;
b. introducing an internal support into said helical configuration of outside diameter corresponding substantially to the inside diameter of the helical configuration;
c. casting material around said helical configuration and support until the material hardens into a solid body;
d. removing said internal support to leave a threaded opening in said body; and, e. cooling said body so that the shrinkage of said body during said cooling reduces the pitch of said helical configuration from said given value to said given thread pitch so that the final threads in the opening have said given thread pitch.

2. The method of claim 1 including the steps of forming end portions of said helical configuration to extend beyond the outside diameter of the configuration and thence turning said end portions towards each other so that they extend in directions parallel to the axis of the helical configuration so that the helical configuration is locked against rotation after said material has hardened.

3. The method of claim 2, in which said given cross-sectional shape is rhombic with the long diagonal substantially normal to the helical axis to thereby lock the helical configuration against axial movement after said material has hardened.

4. The method of claim 1, in which said internal support is provided with a smooth cylindrical surface, the helical configuration being formed such that when it is in a free relaxed state its pitch corresponds to said given value greater than said given thread pitch.

5. The method of claim 1, in which said internal support is externally threaded at a pitch corresponding to said given value to support the individual turns of the helical configuration while the material is hardening, but having a tolerance permitting removal of said support by unthreading after said material has hardened.

6. The method of claim 1, in which said internal support is provided with a smooth cylindrical surface, and including the step of externally spacing the turns of the helical configuration while said internal support is in position, friction between said support and turns holding the turns at the adjusted pitch during the initial casting operation.

7. The method of claim 1, in which the end turns at one end of said helical configuration are formed at a different pitch from the remaining turns extending over said major length so that a thread lock results in the finally formed threaded opening when receiving a threaded fastening of said given thread pitch.

* * * * *